United States Patent
Kanase et al.

(10) Patent No.: US 11,959,543 B2
(45) Date of Patent: Apr. 16, 2024

(54) LUBRICATING STRUCTURE FOR VEHICLE POWER TRANSMISSION DEVICE

(71) Applicant: Honda Motor Co., Ltd., Tokyo (JP)

(72) Inventors: Takuto Kanase, Tokyo (JP); Nobutaka Fukamizu, Tokyo (JP); Seiji Ishii, Tokyo (JP); Takeo Furuta, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/165,304

(22) Filed: Feb. 6, 2023

(65) Prior Publication Data
US 2023/0313879 A1 Oct. 5, 2023

(30) Foreign Application Priority Data
Mar. 30, 2022 (JP) ................................. 2022-057722

(51) Int. Cl.
*F16H 57/04* (2010.01)
(52) U.S. Cl.
CPC ..... *F16H 57/0483* (2013.01); *F16H 57/0409* (2013.01); *F16H 57/0424* (2013.01); *F16H 57/0471* (2013.01)
(58) Field of Classification Search
CPC ............. F16H 57/0483; F16H 57/0409; F16H 57/0424; F16H 57/0471
See application file for complete search history.

(56) References Cited

U.S. PATENT DOCUMENTS

| | | | | |
|---|---|---|---|---|
| 1,631,217 A | * | 6/1927 | Matthews | F16H 57/0483 184/13.1 |
| 3,318,173 A | * | 5/1967 | Puidokas | F16H 48/08 475/160 |
| 3,529,698 A | * | 9/1970 | Nelson | F16H 57/0447 184/6.12 |
| 8,657,073 B2 | * | 2/2014 | Matsumoto | F16H 57/0483 184/6.12 |
| 8,746,405 B2 | * | 6/2014 | Perakes | F16H 57/0409 184/6.12 |
| 8,899,381 B2 | * | 12/2014 | Ebihara | F16H 57/0483 184/6.12 |
| 9,309,958 B2 | * | 4/2016 | Tanaka | F16H 57/0421 |
| 9,546,727 B2 | * | 1/2017 | Kruger | F16H 57/0424 |
| 9,746,068 B2 | * | 8/2017 | Tahara | F16H 57/045 |
| 9,850,999 B2 | * | 12/2017 | Tahara | F16H 57/045 |

(Continued)

FOREIGN PATENT DOCUMENTS

JP 6636877 1/2020

*Primary Examiner* — Michael A Riegelman
(74) *Attorney, Agent, or Firm* — JCIPRNET

(57) ABSTRACT

The disclosure provides a lubricating structure for a vehicle power transmission device that may effectively lubricate a transfer device and a differential device without increasing the amount of oil. The lubricating structure includes: a first guide wall positioned above a bearing; a second guide wall provided below an oil reservoir and extending toward a central axis of a final driven gear; and an oil catch member that receives oil guided by the second guide wall and supplies the oil to a differential device and the bearing. The oil catch member includes a first inclined part inclined so that a direction of the first guide wall is lowered, a notch formed at a position facing an opening formed in a differential case, and a groove for oil guiding that extends toward the bearing.

8 Claims, 16 Drawing Sheets

(56) References Cited

U.S. PATENT DOCUMENTS

| | | | | |
|---|---|---|---|---|
| 9,856,971 B2 * | 1/2018 | Mikami | ................ | F16H 57/045 |
| 9,897,192 B2 * | 2/2018 | Tahara | ................ | F16H 57/0421 |
| 10,385,963 B2 * | 8/2019 | Torii | ................ | F16H 57/0423 |
| 10,550,929 B2 * | 2/2020 | Ahn | ................ | F16H 57/0421 |
| 10,746,282 B2 * | 8/2020 | Ito | ................ | F16H 57/0471 |
| 10,767,752 B2 * | 9/2020 | Kawai | ................ | F16H 57/029 |
| 11,149,838 B2 * | 10/2021 | Hagino | ................ | F01M 9/06 |
| 11,585,426 B2 * | 2/2023 | Toyoshima | ................ | F16H 57/0483 |
| 11,598,410 B2 * | 3/2023 | Ishikawa | ................ | B60K 11/02 |
| 2008/0096715 A1 * | 4/2008 | Ono | ................ | F16C 19/364 |
| | | | | 475/160 |
| 2009/0165587 A1 * | 7/2009 | Ariga | ................ | F16H 57/0423 |
| | | | | 475/160 |
| 2011/0192245 A1 * | 8/2011 | Shioiri | ................ | F16H 57/0423 |
| | | | | 74/467 |
| 2012/0096968 A1 * | 4/2012 | Kawamoto | ................ | F16H 57/0423 |
| | | | | 74/467 |
| 2012/0172167 A1 * | 7/2012 | Myers | ................ | F16H 57/0457 |
| | | | | 475/160 |
| 2015/0204436 A1 * | 7/2015 | Mafune | ................ | F16H 57/0409 |
| | | | | 475/160 |
| 2015/0276043 A1 * | 10/2015 | Girardot | ................ | F16H 57/0457 |
| | | | | 475/160 |
| 2016/0153546 A1 * | 6/2016 | Ogawa | ................ | F16H 57/0457 |
| | | | | 74/665 F |
| 2017/0102064 A1 * | 4/2017 | Preston | ................ | F16H 57/0483 |
| 2018/0340604 A1 * | 11/2018 | Yageta | ................ | F16H 57/0471 |
| 2019/0285166 A1 * | 9/2019 | Kawai | ................ | F16H 57/04 |
| 2023/0313879 A1 * | 10/2023 | Kanase | ................ | F16H 57/0471 |
| | | | | 184/6.12 |

* cited by examiner

LUBRICATING STRUCTURE FOR VEHICLE POWER TRANSMISSION DEVICE

CROSS-REFERENCE TO RELATED APPLICATION

This application claims the priority benefit of Japan application serial no. 2022-057722, filed on Mar. 30, 2022. The entirety of the above-mentioned patent application is hereby incorporated by reference herein and made a part of this specification.

BACKGROUND

Technical Field

The disclosure relates to a lubricating structure for a vehicle power transmission device mounted on a four-wheel drive vehicle (4WD vehicle).

Related Art

Rotating members such as various gears are housed in a case in a transmission of a vehicle power transmission device that transmits the drive force of a drive source such as an engine or an electric motor to the wheels. An oil bath system may be adopted as a lubricating method in which lubricating oil stored in the bottom of the case is scraped up by the rotation of the rotating members, and each part is lubricated by the scraped-up oil.

In addition, there is a four-wheel drive vehicle (4WD vehicle) that travels by transmitting the drive force of the drive source disposed in the front to the left and right front wheels and the left and right rear wheels, respectively. A power transmission device for such a four-wheel drive vehicle is provided with a transfer device for transmitting the drive force from the front differential device to the rear differential device, and this transfer device is connected to the rear differential device via a propeller shaft. Here, the front differential device distributes and transmits the drive force to the left and right front wheels, and the rear differential device distributes and transmits the drive force to the left and right rear wheels.

By the way, there is a transmission for such a four-wheel drive vehicle in which the transfer device is disposed above the front differential device (see, for example, Patent Literature 1).

CITATION LIST

Patent Literature

[Patent Literature 1] Japanese Granted Patent Publication No. 6636877

By the way, in a four-wheel drive vehicle, it is necessary to lubricate a transfer device and a front differential device with oil that is scraped up by rotating members housed in a transmission case of a power transmission device. In this case, in a power transmission device including a transmission in which the transfer device is disposed above the front differential device, the amount of oil may be insufficient for the transmission of a two-wheel drive vehicle (2WD) or a four-wheel drive vehicle in which the transfer device is disposed below the front differential device.

In this regard, it is possible to increase the amount of oil, but if the amount of oil is increased, the drag loss (stirring resistance) due to the viscosity of the oil when the rotating members scrape up the oil increases, resulting in worse fuel efficiency and increased weight.

In view of the above, the disclosure provides a lubricating structure for a vehicle power transmission device that may effectively lubricate a transfer device and a front differential device without increasing the amount of oil.

SUMMARY

In view of the above, a lubricating structure for a vehicle power transmission device according to the disclosure includes a case (61, 71) in which oil is stored at a bottom. The case houses: a transmission including a differential device (4), a final driven gear (44) attached to a differential case (41) of the differential device (4) and rotatably supported on the case (61) by a bearing (42), and a final drive gear (30) meshing with the final driven gear (44); and a transfer device (5) including a transfer input gear (52) that meshes with the final driven gear (44). The transfer input gear (52) meshes with the final driven gear (44) above a rotation center of the final driven gear (44). The case (61) includes: a first guide wall (64) positioned above the bearing (42) for guiding oil scraped up by the final drive gear (30) or the transfer input gear (52) to the differential device (4) and the bearing (42); an oil reservoir (63) provided above the transfer input gear (52); and a second guide wall (65) provided below the oil reservoir (63) and extending toward a central axis of the final driven gear (44). The lubricating structure further includes an oil catch member (80) that receives oil guided by the second guide wall (65) and supplies the oil to the differential device (4) and the bearing (42). The oil catch member (80) includes a first inclined part (81) inclined so that a direction of the first guide wall (64) is lowered, a notch (83) formed at a position facing an opening (41c) formed in the differential case (41), and a groove (84) for oil guiding that extends toward the bearing (42).

DESCRIPTION OF THE EMBODIMENTS

Figure 1:
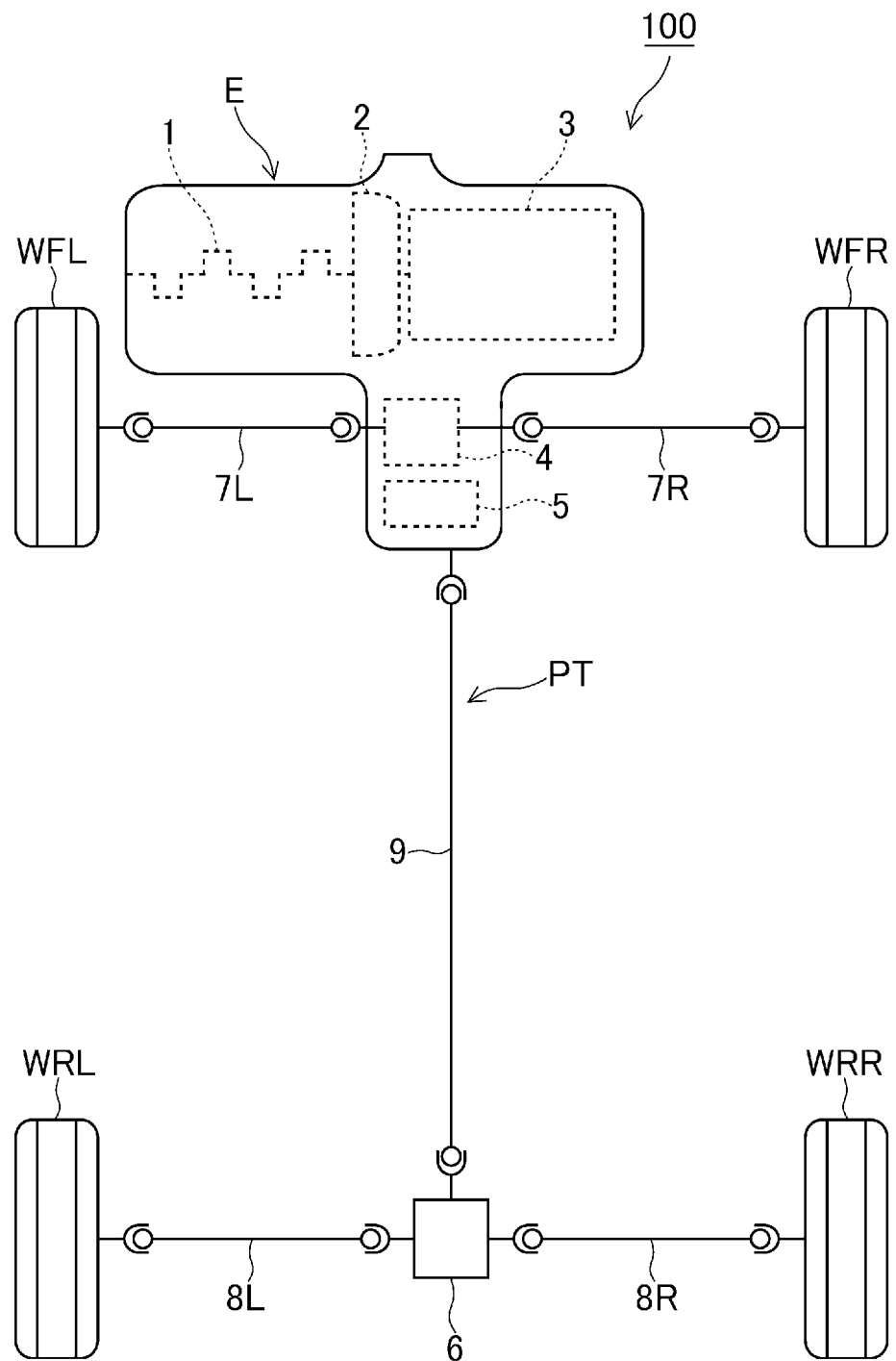
FIG. 1 is a plan view showing the basic configuration of a power transmission system of a four-wheel drive vehicle.

According to the lubricating structure for the vehicle power transmission device of the disclosure, the oil that is scraped up by the final drive gear or the transfer input gear is guided by the first guide wall to the differential device and the bearing that supports the final driven gear. Therefore, the oil lubricates the differential device and the bearing effectively. In addition, by providing the oil catch member configured as described above, the oil that has been scraped up by the rotation of the transfer input gear and the final driven gear and has flowed into the oil reservoir is guided from the second oil reservoir to the differential device and the bearing through the second guide wall and the oil catch member. Therefore, the differential device and the bearing are lubricated more effectively. In particular, since oil is supplied to the opening of the differential case through the notch formed in the oil catch member, the pinion shaft, the side gear and the like in the differential device may be effectively lubricated. At the same time, since oil is supplied to the bearing through the groove for oil guiding, the bearing may be effectively lubricated.

Further, in this lubricating structure for the vehicle power transmission device, the oil catch member (80) may be disposed at a position lower than a lower end (65a) of the second guide wall (65) with a gap (L1) therebetween.

According to this configuration, since the oil catch member is positioned lower than the lower end of the second guide wall, oil dripping from the lower end of the second guide wall may be more reliably received by the oil catch member, and may be supplied to the differential device and the bearing. In addition, since the oil catch member is disposed with a gap between it and the lower end of the second guide wall, the oil scraped up by the final driven gear or the transfer input gear passes through this gap and is guided to the oil catch member and the first guide wall. Therefore, it is possible to effectively perform lubrication by the oil scraped up by the final driven gear or the transfer input gear.

Further, in this lubricating structure for the vehicle power transmission device, the oil catch member (80) may include: an oil receiving part (81) that receives oil from the second guide wall (65); and a second inclined part (82) inclined from the oil receiving part (81) toward the bearing (42). The first inclined part (81) and the notch (83) may be provided in the oil receiving part (81). The groove (84) may be provided in the second inclined part (82).

According to this configuration, oil may be guided into the opening of the differential case by the first inclined part and the notch provided in the oil receiving part of the oil catch member. Therefore, it is possible to perform effective lubrication of the differential device, and it is possible to perform effective lubrication of the bearing that supports the final driven gear by the groove provided in the inclined part.

Further, in this lubricating structure for the vehicle power transmission device, another notch (64f) may be provided at a position facing the opening (41c) of the differential case (41) in a lower end (64a) of the first guide wall (64).

According to this configuration, the oil may be guided to the opening of the differential case through this another notch of the first guide wall. Therefore, it is possible to more effectively lubricate the differential device by the first guide wall.

According to the disclosure, it is possible to effectively lubricate the transfer device and the differential device of the vehicle power transmission device without increasing the amount of oil.

Hereinafter, embodiments of the disclosure will be described with reference to the accompanying drawings.

[Basic Configuration of Vehicle Power Transmission Device]

Figure 2:
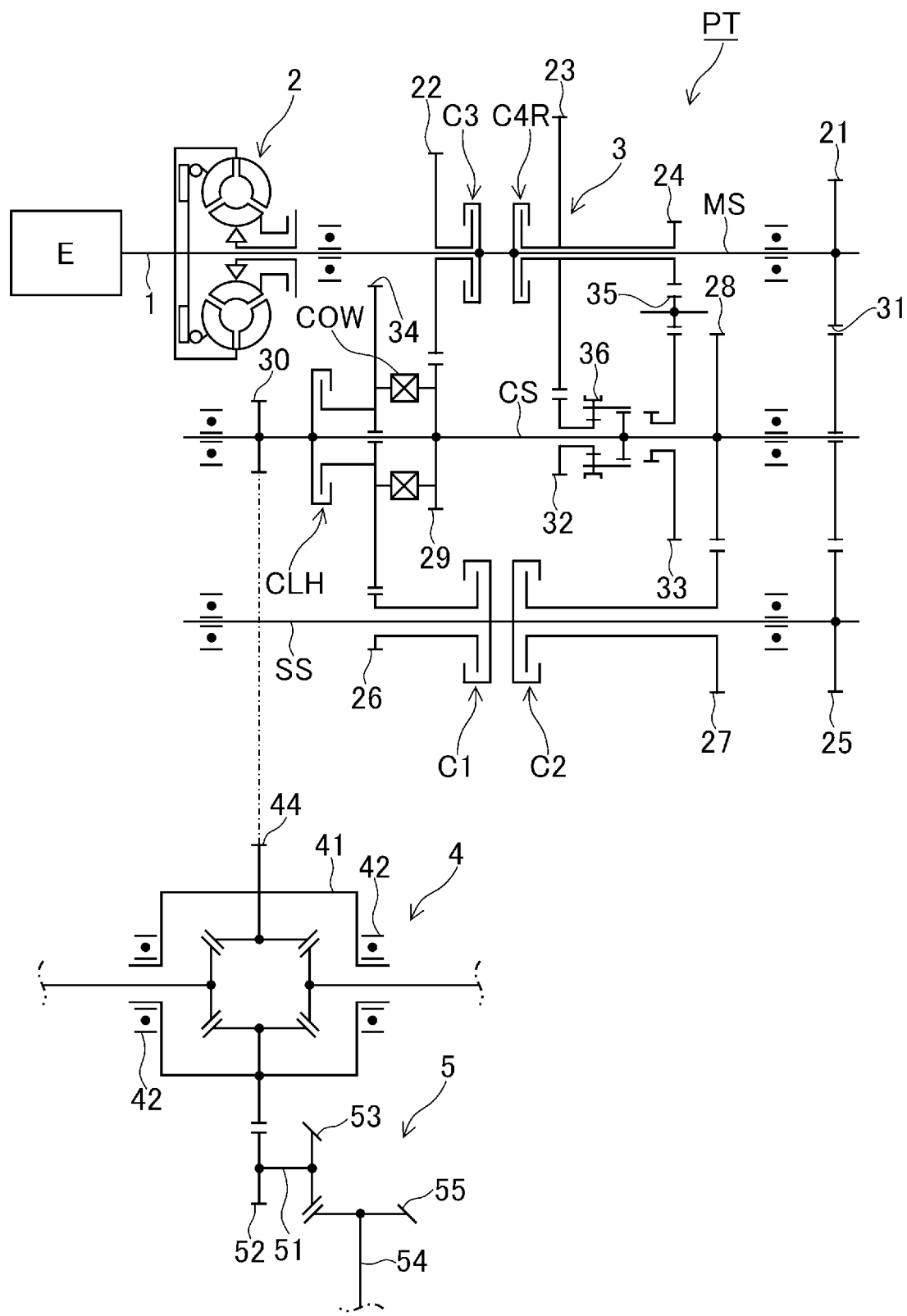
FIG. 2 is a skeleton view showing the basic configuration of a vehicle power transmission device including a lubricating structure according to the disclosure.

FIG. 1 is a plan view showing the basic configuration of a power transmission system of a four-wheel drive vehicle, and FIG. 2 is a skeleton view showing the basic configuration of a vehicle power transmission device including a lubricating structure according to the disclosure.

In a four-wheel drive vehicle 100 shown in FIG. 1, an engine E as a drive source is disposed in the front part (upper part in FIG. 1); a torque converter 2 and a transmission 3 are connected in sequence to a crankshaft 1; and the engine E, the torque converter 2 and the transmission 3 are mounted on the front part of the vehicle body in a state of being disposed side by side in the vehicle width direction (horizontal direction in FIG. 1).

A power transmission device PT for transmitting the drive force of the engine E to left and right front wheels WFL and WFR and to left and right rear wheels WRL and WRR respectively includes the torque converter 2, the transmission 3 connected to the torque converter 2, a front differential device 4 connected to the transmission 3, a transfer device 5 connected to the front differential device 4, and a rear differential device 6 connected to the transfer device 5.

The front differential device 4 is connected to left and right front wheels WFL and WFR via left and right front axles 7L and 7R, and the rear differential device 6 is connected to left and right rear wheels WRL and WRR via left and right rear axles 8L and 8R. The rear differential device 6 is connected to the transfer device 5 via a propeller shaft 9 disposed along the front-rear direction of the vehicle (up-down direction in FIG. 1).

By the way, as shown in FIG. 2, in the transmission 3, a main shaft MS, a secondary shaft SS, and a counter shaft CS extending in the vehicle width direction are disposed to be parallel and rotatable. A main drive gear 21 is fixed to the main shaft MS; and a main third-speed gear 22 connectable to the main shaft MS by a third-speed clutch C3 and a main fourth-speed gear 23 and a main reverse gear 24 connectable to the main shaft MS by a fourth-speed reverse clutch C4R are supported to be relatively rotatable.

Further, a secondary driven gear 25 is fixed to the secondary shaft SS; and a secondary first-speed gear 26 connectable to the secondary shaft SS by a first-speed clutch C1 and a secondary second-speed gear 27 connectable to the secondary shaft SS by a second-speed clutch C2 are supported in a relatively rotatable way.

A counter second-speed gear 28, a counter third-speed gear 29 and a final drive gear 30 are fixed to the counter shaft CS; and a counter idle gear 31, a counter fourth-speed gear 32 and a counter reverse gear 33 are supported in a relatively rotatable way. A counter first-speed gear 34 connectable to the counter shaft CS via a first-speed hold clutch CLH is supported in a relatively rotatable way on the counter shaft CS.

Here, a reverse idle gear 35 meshes with the main reverse gear 24 and the counter reverse gear 33. The counter first-speed gear 34 is connectable to the counter third-speed gear 29 by a one-way clutch COW, and the counter fourth-speed gear 32 and the counter reverse gear 33 is selectively connectable to the counter shaft CS by a selector 36.

The main drive gear 21 meshes with the counter idle gear 31, and the counter idle gear 31 meshes with the secondary driven gear 25. Therefore, the rotation of the crankshaft 1 of the engine E is transmitted through the torque converter 2, the main shaft MS, the main drive gear 21, the counter idle gear 31 and the secondary driven gear 25 to the secondary shaft SS.

Further, when the secondary first-speed gear 26 rotatably supported on the secondary shaft SS is connected to the secondary shaft SS by the first-speed gear clutch C1, the rotation of the secondary shaft SS is transmitted through the first-speed gear clutch C1, the secondary first-speed gear 26, the one-way clutch COW and the counter third-speed gear 29 to the counter shaft CS to establish the first-speed shift stage. The first-speed clutch C1 is maintained in the engaged state even when the second- to fourth-speed shift stages are established, but the one-way clutch COW slips when the second- to fourth-speed shift stages are established.

Then, when the secondary second-speed gear 27 supported on the secondary shaft SS in a relatively rotatable way is connected to the secondary shaft SS by the second-speed clutch C2, the rotation of the secondary shaft SS is transmitted through the second-speed clutch C2, the secondary second-speed gear 27 and the counter second-speed gear 28 to the counter shaft CS to establish the second-speed shift stage.

Further, when the main third-speed gear 22 supported on the main shaft MS in a relatively rotatable way is connected to the main shaft MS by the third-speed clutch C3, the rotation of the main shaft MS is transmitted through the third-speed clutch C3, the main third-speed gear 22 and the counter third-speed gear 29 to the counter shaft CS to establish the third-speed shift stage.

Then, in a state where the counter fourth-speed gear 32 supported on the counter shaft CS in a relatively rotatable way is connected to the counter shaft CS by the selector 36, when the main fourth-speed gear 23 supported on the main shaft MS in a relatively rotatable way is connected to the main shaft MS by the fourth-speed reverse clutch C4R, the rotation of the main shaft MS is transmitted through the fourth-speed reverse clutch C4R, the main reverse gear 24, the reverse idle gear 35, the counter reverse gear 33 and the selector 36 to the counter shaft CS to establish the fourth-speed shift stage.

In addition, in a state where the counter reverse gear 33 supported on the counter shaft CS in a relatively rotatable way is connected to the counter shaft CS by the selector 36, when the main reverse gear 24 supported on the main shaft MS in a relatively rotatable way is connected to the main shaft MS by the fourth-speed reverse clutch C4R, the rotation of the main shaft MS is transmitted through the fourth-speed reverse clutch C4R, the main reverse gear 24, the reverse idle gear 35, the counter reverse gear 33 and the selector 36 to the counter shaft CS to establish a reverse shift stage.

Further, when the first-speed hold clutch CLH is engaged while the first-speed clutch C1 is engaged, the first-speed hold shift stage is established. If the first-speed hold shift stage is established when strong engine braking is required, even if the one-way clutch COW slips, the torque of the rear wheels WRL and WRR may be transmitted back to the engine E via the first-speed hold clutch CLH.

Next, the configuration of the front differential device 4 will be described.

As shown in FIG. 2, the front differential device 4 includes a differential case 41 rotatably supported on a transmission case 61 (see FIG. 3), which will be described later, via bearings 42, and a large-diameter final driven gear 44 is fixed to the outer periphery of the differential case 41. Here, the final driven gear 44 meshes with the final drive gear 30 fixed to the counter shaft CS. Since the configurations of the front differential device 4 and the rear differential device 6 are known, detailed description thereof will be omitted.

Further, in the transmission 3, the rotation of the counter shaft CS is transmitted to the differential case 41 via the final drive gear 30 and the final driven gear 44, and the rotation of the differential case 41 is transmitted to the left and right front axles 7L and 7R in accordance with the load on the left and right front wheels WFL and WFR, and the left and right front wheels WFL and WFR are rotationally driven.

Next, the configuration of the transfer device 5 will be described.

In the transfer device 5, a transfer input gear 52 and a first bevel gear 53 are formed at two axial ends of a transfer input shaft 51 disposed rotatably in the vehicle width direction, and the transfer input gear 52 is meshed with the final driven gear 44 of the front differential device 4. Further, the first bevel gear 53 meshes with a second bevel gear 55 fixed to one axial end (front end) of a rotatable transfer output shaft 54 disposed in the front-rear direction of the vehicle. The other end (rear end) of the transfer output shaft 54 is connected to the propeller shaft 9 shown in FIG. 1 by a joint (not shown).

Therefore, the rotation transmitted from the engine E to the final driven gear 44 of the front differential device 4 is transmitted through the transfer input gear 52, the transfer input shaft 51, the first bevel gear 53, the second bevel gear 55, the transfer output shaft 54 and the propeller shaft 9 to the rear differential device 6 shown in FIG. 1, and is divided by the rear differential device 6 and transmitted to the left and right rear axles 8L and 8R, and the left and right rear wheels WRL and WRR are rotationally driven. As a result, the four-wheel drive vehicle 100 shown in FIG. 1 travels due to the rotation of the left and right front wheels WFL and WFR and the left and right rear wheels WRL and WRR.

[Lubricating Structure of Power Transmission Device]

Next, the lubricating structure of the power transmission device according to the disclosure will be described.

Figure 3:
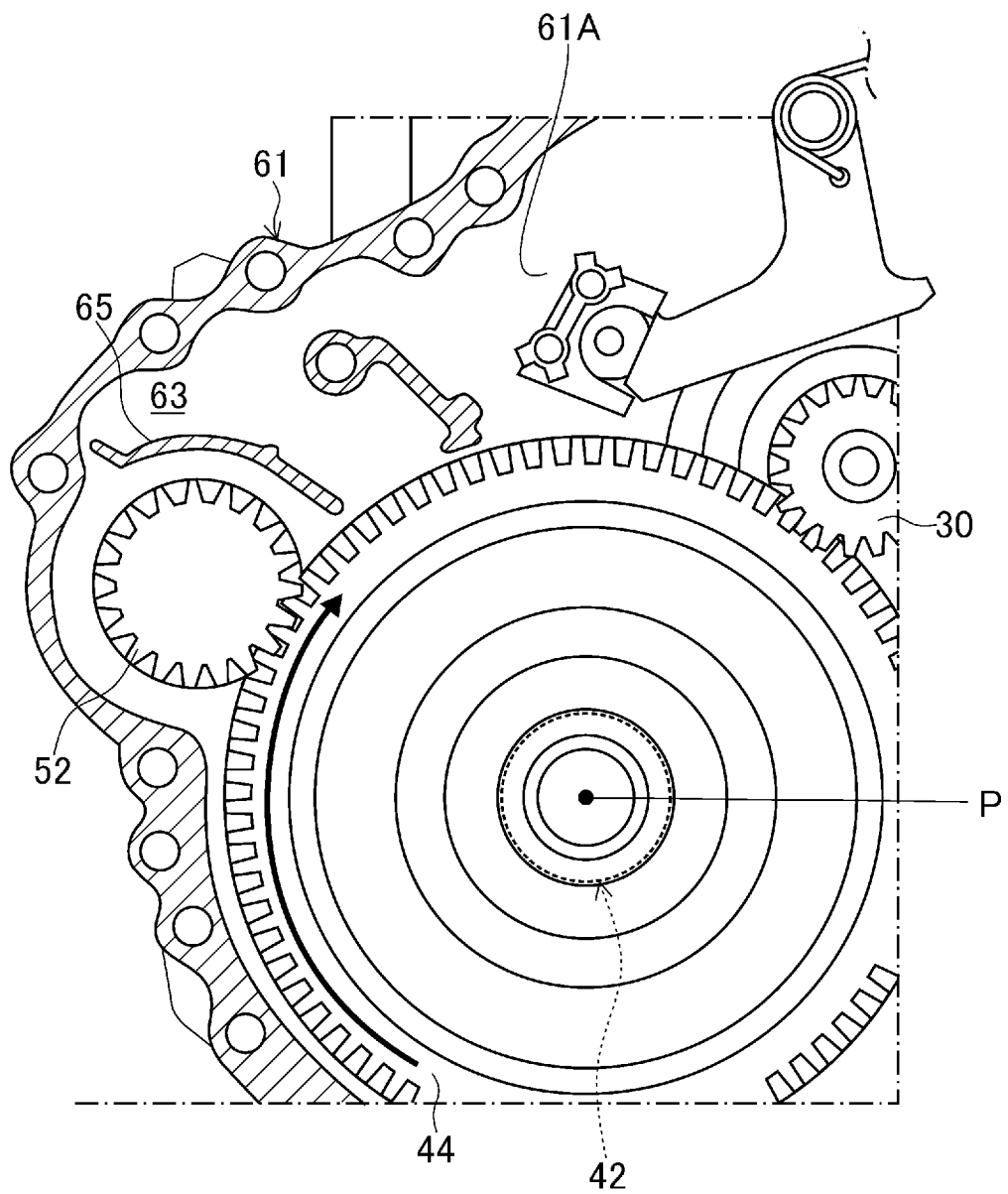
FIG. 3 is a partial side view showing the configuration of the mating surface side of the transmission case with the torque converter case.
Figure 4:
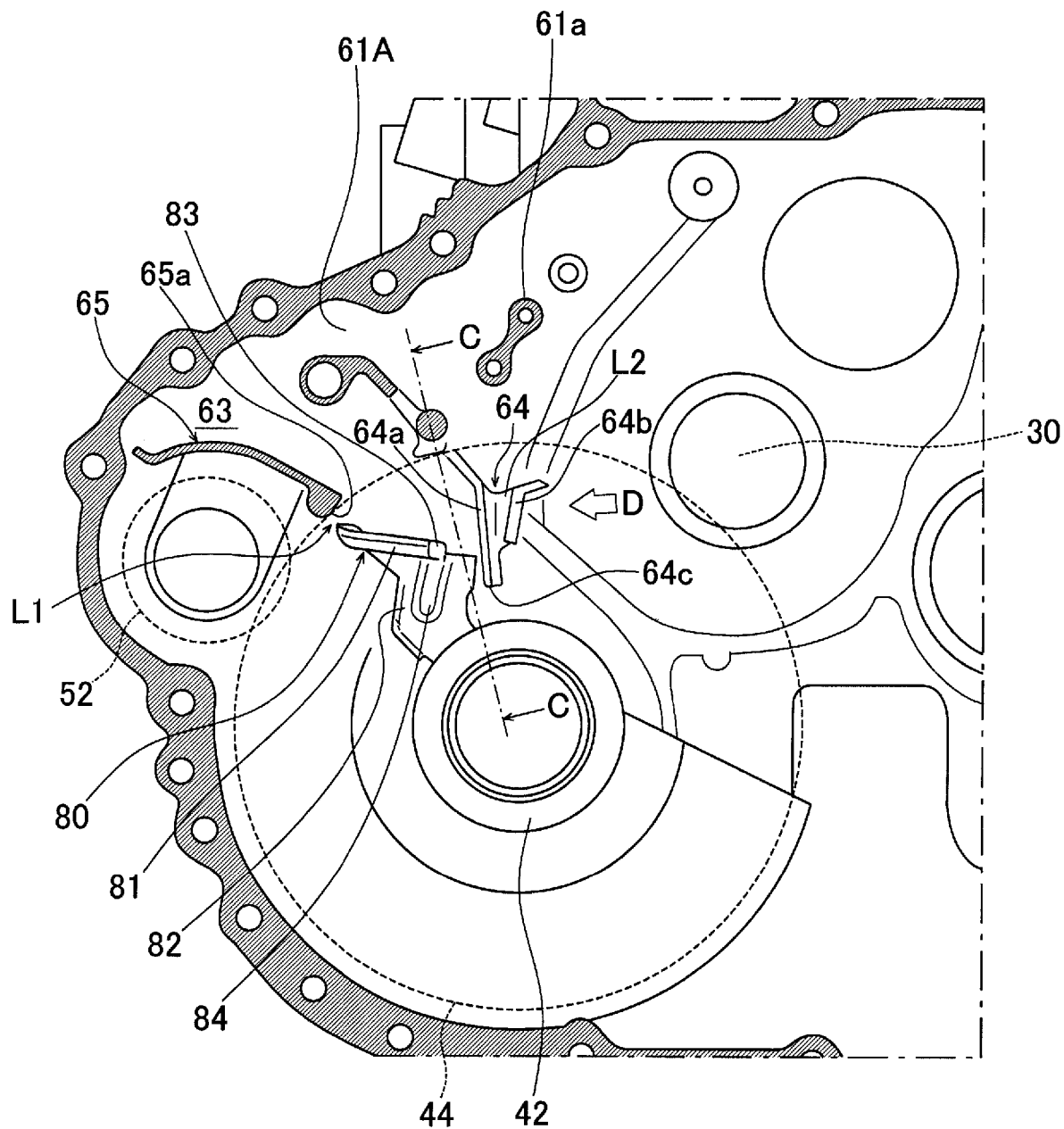
FIG. 4 is a partial side view showing the configuration of the mating surface side of the transmission case with the torque converter case, with various gears removed.
Figure 5:
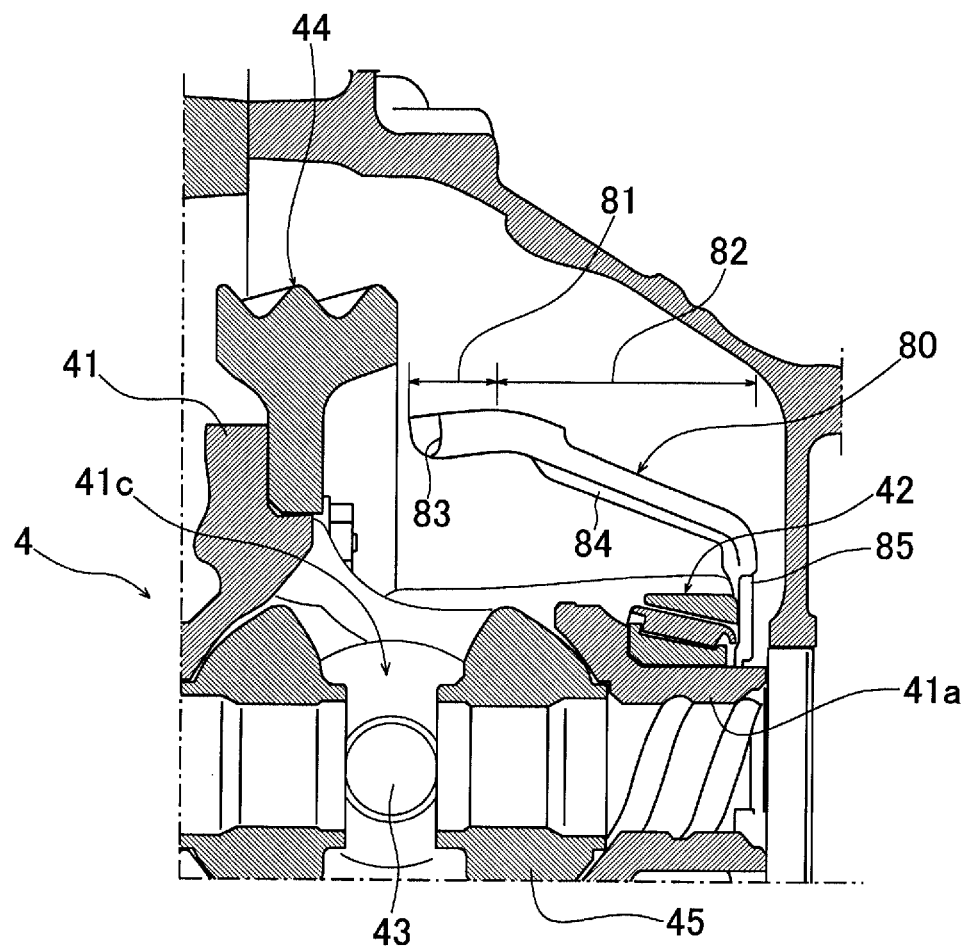
FIG. 5 is a cross-sectional view taken along the line C-C of FIG. 4.

FIG. 3 is a partial side view showing the configuration of the mating surface side of the transmission case with the torque converter case. FIG. 4 is a partial side view showing the configuration of the mating surface side of the transmission case with the torque converter case, with various gears removed. FIG. 5 is a cross-sectional view taken along the line C-C of FIG. 4.

The case that houses the transmission 3, the front differential device (hereinafter simply referred to as the "differential device") 4, and the transfer device 5 shown in FIG. 2 is formed by joining the transmission case 61 shown in FIG. 3 and the torque converter case 71 (see FIG. 9) together with multiple bolts (not shown).

As shown in FIG. 3, the large-diameter final driven gear 44, the small-diameter final drive gear 30 and the transfer input gear 52 meshing with the final driven gear 44 are provided on a mating surface side of the transmission case 61 with the torque converter case 71. Lubricating oil is stored in the bottoms of the transmission case 61 and the torque converter case 71, and a part of the final driven gear 44 is immersed in this oil. Here, the transfer input gear 52 meshes with the final driven gear 44 at a position above the rotation center P of the final driven gear 44 when the vehicle is loaded on a flat road.

As shown in FIG. 5, the differential case 41 includes a pair of cylindrical inboard parts (boss parts) 41a extending in the left-right direction of the vehicle body. The inboard part 41a is supported by the inner race of the bearing 42 at its outer peripheral surface. The bearing 42 is a tapered roller bearing including a roller whose axial direction is inclined with respect to the axial direction of the inboard part 41a. A pinion shaft 43 is supported inside the differential case 41. The pinion shaft 43 is fixed to the differential case 41 to be non-rotatable, non-insertable and non-removable. A pinion gear (differential pinion, not shown) is rotatably supported on the pinion shaft 43. A side gear (drive pinion) 45 meshing with the pinion gear is spline-connected to an axle (not shown). An opening (differential opening) 41c is formed in the upper part of the differential case 41, and components such as the pinion shaft 43 and the side gear 45 in the differential case 41 are disposed below the opening 41c (inside the opening 41c).

Figure 6:
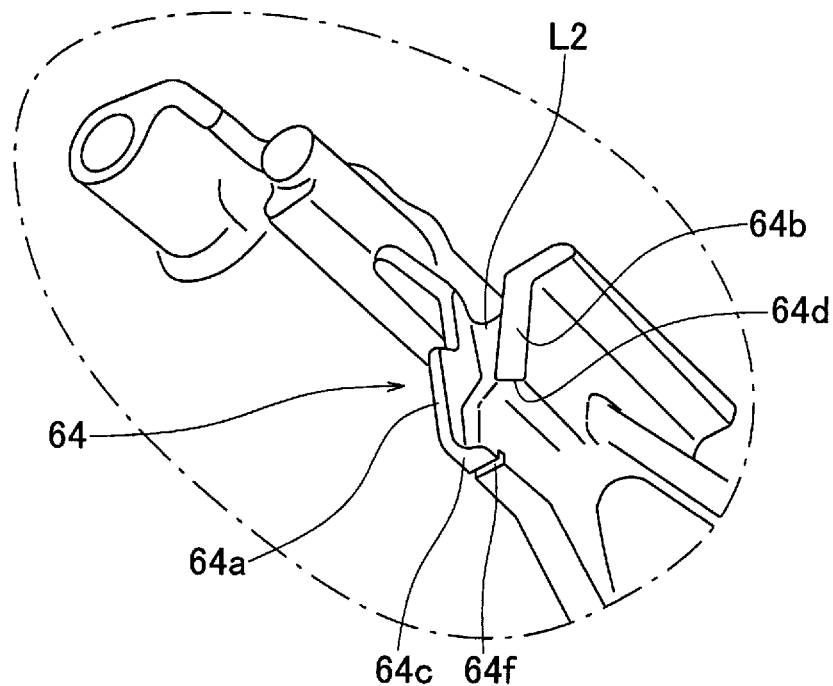
FIG. 6 is a perspective view of the first guide wall and its surroundings viewed obliquely from below.
Figure 7:
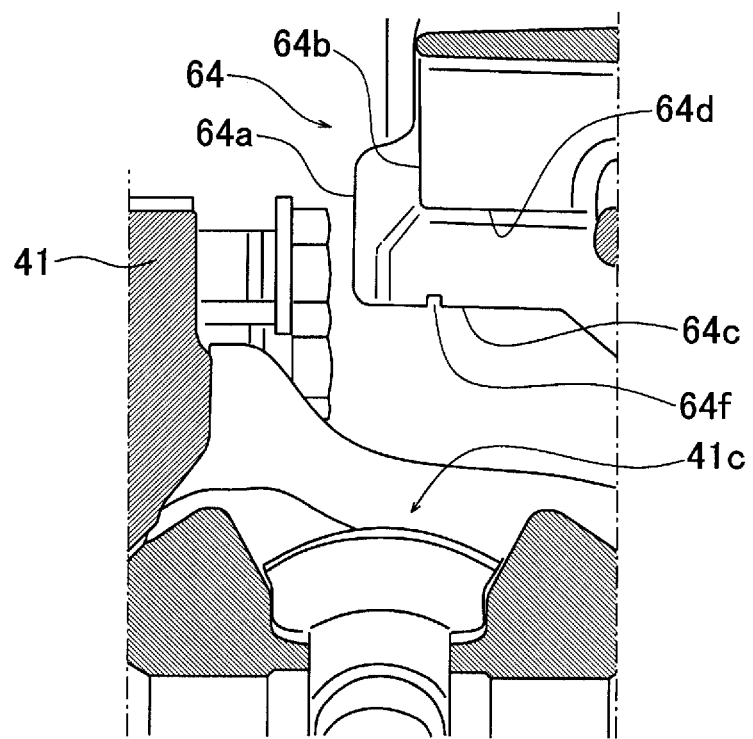
FIG. 7 is a side view of the first guide wall viewed from the lateral direction, as viewed from the arrow D in FIG. 4.

Further, as shown in FIG. 4, a first guide wall 64 is formed above the bearing 42 inside the transmission case 61. FIGS. 6 and 7 are views showing the detailed configuration of the first guide wall. FIG. 6 is a perspective view of the first guide wall and its surroundings viewed obliquely from below. FIG. 7 is a side view of the first guide wall viewed from the lateral direction, as viewed from the arrow D in FIG. 4. The first guide wall 64 is located above the bearing 42 and functions to guide the oil scraped up by the transfer input gear 52 and the oil scattered by the rotation of the final drive gear 30 to the bearing 42. The first guide wall 64 includes a first rib 64a extending in the substantial up-down direction and extending toward the axial center of the final driven gear 44, and a second rib 64b disposed on the side of the first rib 64a (right side in FIG. 4), formed in a substantially horizontal V shape, and extending toward the axial center of the final driven gear 44 from its lower end side. Here, a gap L2 is provided between the first rib 64a and the second rib 64b, and the oil flowing along the surface (upper surface) of the first rib 64a is guided to the differential device 4 and the bearing 42 through the gap L2.

As shown in FIGS. 6 and 7, a notch 64f is formed by notching a lower end 64c of the first rib 64a in a substantially U shape at a position directly above the opening 41c of the differential case 41 in the lower end 64c of the first rib 64a (a position facing the opening 41c). The notch 64f corresponds to "another notch" of the disclosure. The notch 64f is formed at a position corresponding to the lower end 64c of the first rib 64a and below (substantially directly below) a lower end part 64d of the second rib 64b.

As shown in FIG. 4, a boss-shaped guide part (mounting seat) for mounting components of a parking mechanism (not shown) is integrally formed on the upper part of a vertical wall 61A of the transmission case 61 (above the bearing 42 that supports the final driven gear 44).

Figure 9:
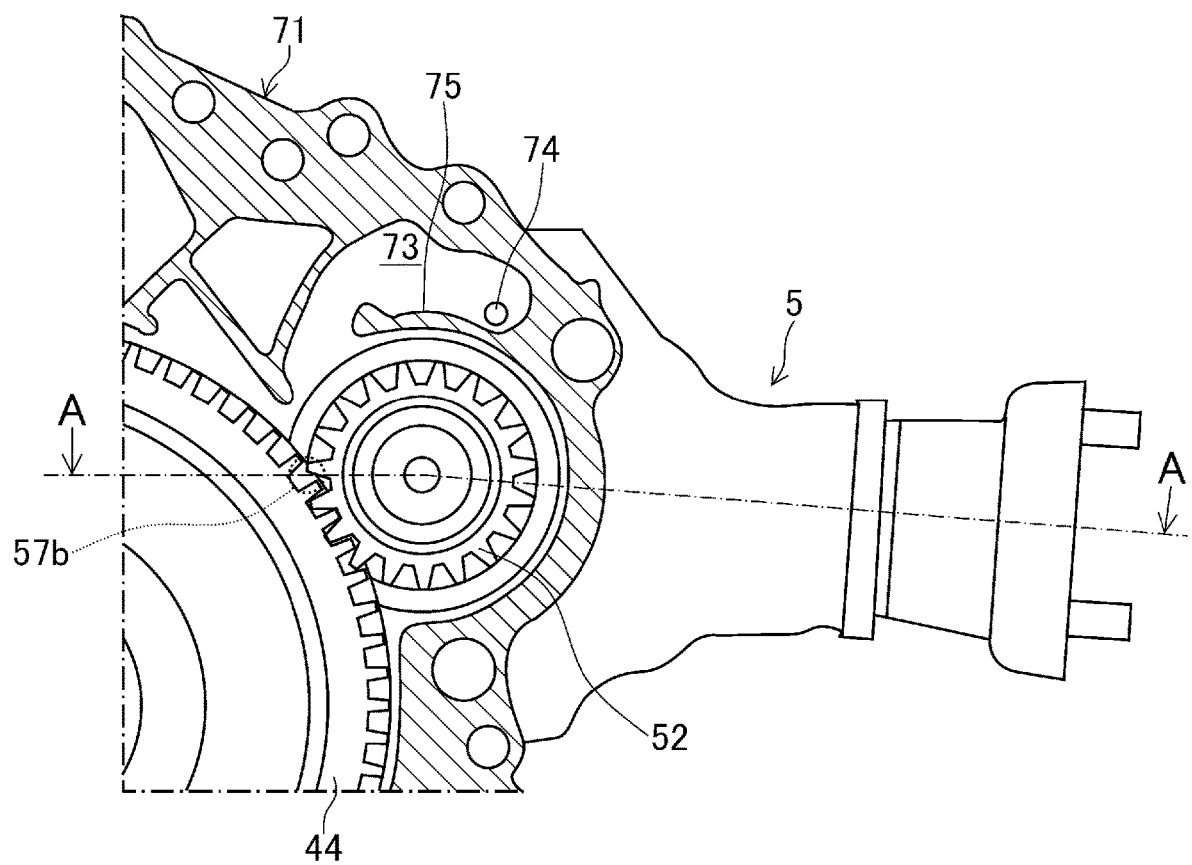
FIG. 9 is a partial side cross-sectional view showing the configuration of the mating surface side of the torque converter case with the transmission case.

Further, as shown in FIG. 4 and FIG. 9 which will be described later, a first oil reservoir 73 is provided above the transfer input gear 52 in the torque converter case 71. The first oil reservoir 73 is a space partitioned from the transfer input gear 52 by a substantially arc-shaped rib 75 (see FIG. 9) along a part on the upper side of the transfer input gear 52. Further, a second oil reservoir 63 is provided in the transmission case 61. The second oil reservoir 63 is a space partitioned from the transfer input gear 52 by a substantially arc-shaped second guide wall 65 along a part on the upper side of the transfer input gear 52. The first oil reservoir 73 and the second oil reservoir 63 are provided between the side surface of the transmission case 61 and the side surface of the torque converter case 71 in the axial direction.

Figure 8:
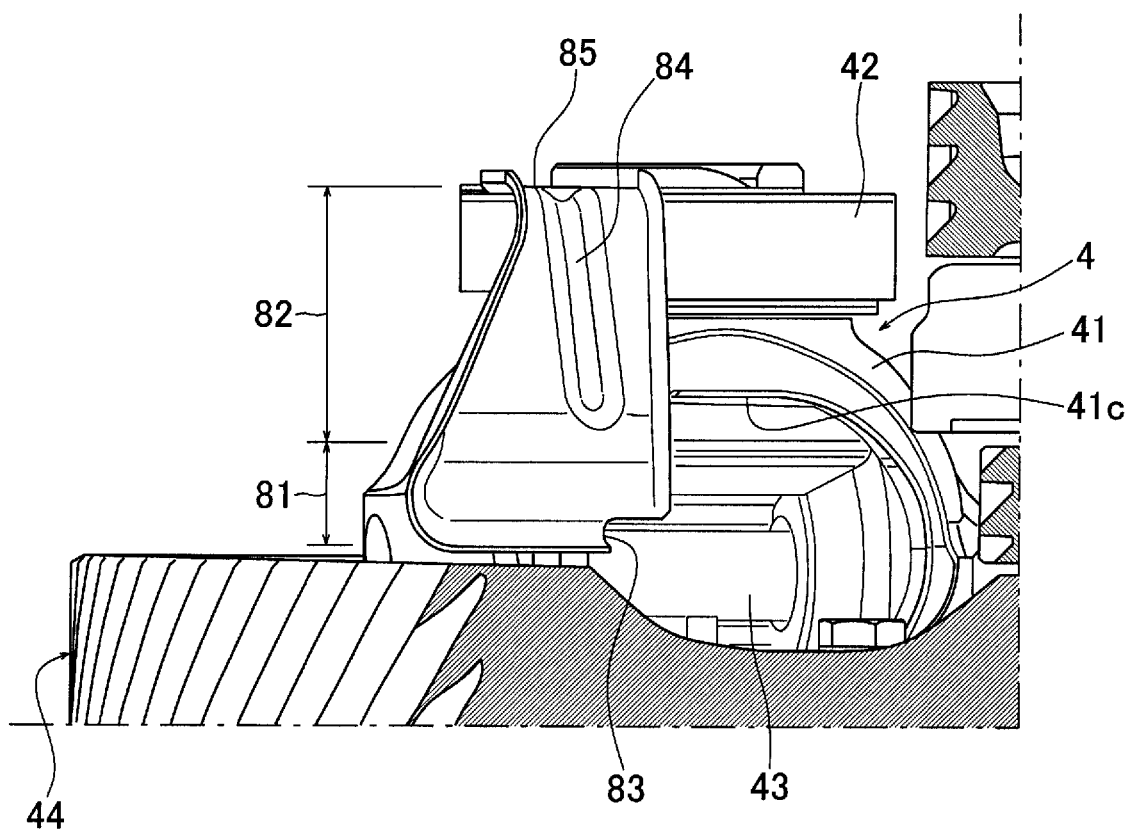
FIG. 8 is a schematic plan view of the gutter plate and its surroundings viewed from above.

As shown in FIG. 4, a gutter plate (oil catch member) 80 is provided for receiving oil guided by the second guide wall 65 and supplying the oil to the differential device 4 and the bearing 42. FIG. 8 is a schematic plan view of the gutter plate 80 and its surroundings viewed from above. As shown in FIGS. 4, 5, and 8, the gutter plate 80 includes an oil receiving part 81 that receives oil from the second guide wall 65, and an inclined part (second inclined part) 82 inclined from the oil receiving part 81 toward the bearing 42.

As shown in FIG. 4, the oil receiving part 81 is a part (first inclined part) formed in an inclined plane shape between the lower end 65a of the second guide wall 65 and the first rib 64a of the first guide wall 64 and is inclined so that the direction of the first guide wall 64 is lowered from the guide wall 65 side toward the first wall 64 side. In addition, as shown in FIG. 5, the oil receiving part 81 is not inclined from the second guide wall 65 side toward the bearing 42 side (from the front side to the back side of the paper surface in FIG. 4), and forms a non-inclined surface in that direction.

As shown in FIGS. 5 and 8, the bottom wall of the end (lower end) of the oil receiving part 81 on the first guide wall 64 side has a notch 83 formed by notching a part of the bottom wall. The notch 83 is formed directly above the opening 41c of the differential case 41 (a position facing the opening 41c), and allows the oil received by the oil receiving part 81 of the gutter plate 80 to drip from the notch 83 to the opening 41c located directly below.

As shown in FIGS. 5 and 8, the inclined part 82 of the gutter plate 80 is formed in an inclined plane shape between the oil receiving part 81 and the upper part of the bearing 42 to be gradually lowered from the oil receiving part 81 toward the upper part of the bearing 42, and includes a groove 84 for oil guiding that extends in the longitudinal direction from the oil receiving part 81 toward the bearing 42 at substantially the center in the width direction (left-right direction in FIG. 4). The groove 84 is a gutter-shaped channel whose cross section is recessed lower than the surface of the inclined part 82. The end of the inclined part 82 on the bearing 42 side (the upper end in FIG. 8) is curved downward to form an extension part 85 extending directly downward toward the upper end of the bearing 42. The extension part 85 functions as a discharge plate that discharges the oil received by the gutter plate 80 toward the bearing 42 through the axial gap between the vertical wall 61A of the transmission case 61 and the vertical wall 61A. The groove 84 is formed continuously from the inclined part 82 to the extension part 85 of the gutter plate 80. As will be described later, the groove 84 serves to properly guide the oil received by the gutter plate 80 downstream, and also serves to ensure the required strength of the gutter plate 80. A peripheral wall is erected on the outer periphery of the oil receiving part 81 and the inclined part 82 of the gutter plate 80, and this peripheral wall prevents the oil that is received by the oil receiving part 81 and flows through the inclined part 82 from spilling over.

Further, as shown in FIG. 4, the gutter plate 80 is disposed at a position lower than the lower end 65a of the second guide wall 65 with a gap L1 between it and the lower end 65a. That is, the oil receiving part 81 of the gutter plate 80 is disposed obliquely downward (lower right in FIG. 4) with respect to the lower end 65a of the second guide wall 65 with the gap L1 interposed therebetween. Therefore, the oil dripping from the lower end 65a of the second guide wall 65 is received by the oil receiving part 81 of the gutter plate 80.

The gutter plate 80 configured as described above functions to receive oil that has been scraped up by the final driven gear 44, the final drive gear 30, and the transfer input gear 52 and has flowed into the first oil reservoir 73. 41c) and the bearing 42, and to guide the oil to the differential device 4 (the opening 41c of the differential case 41) and the bearing 42.

Figure 10:
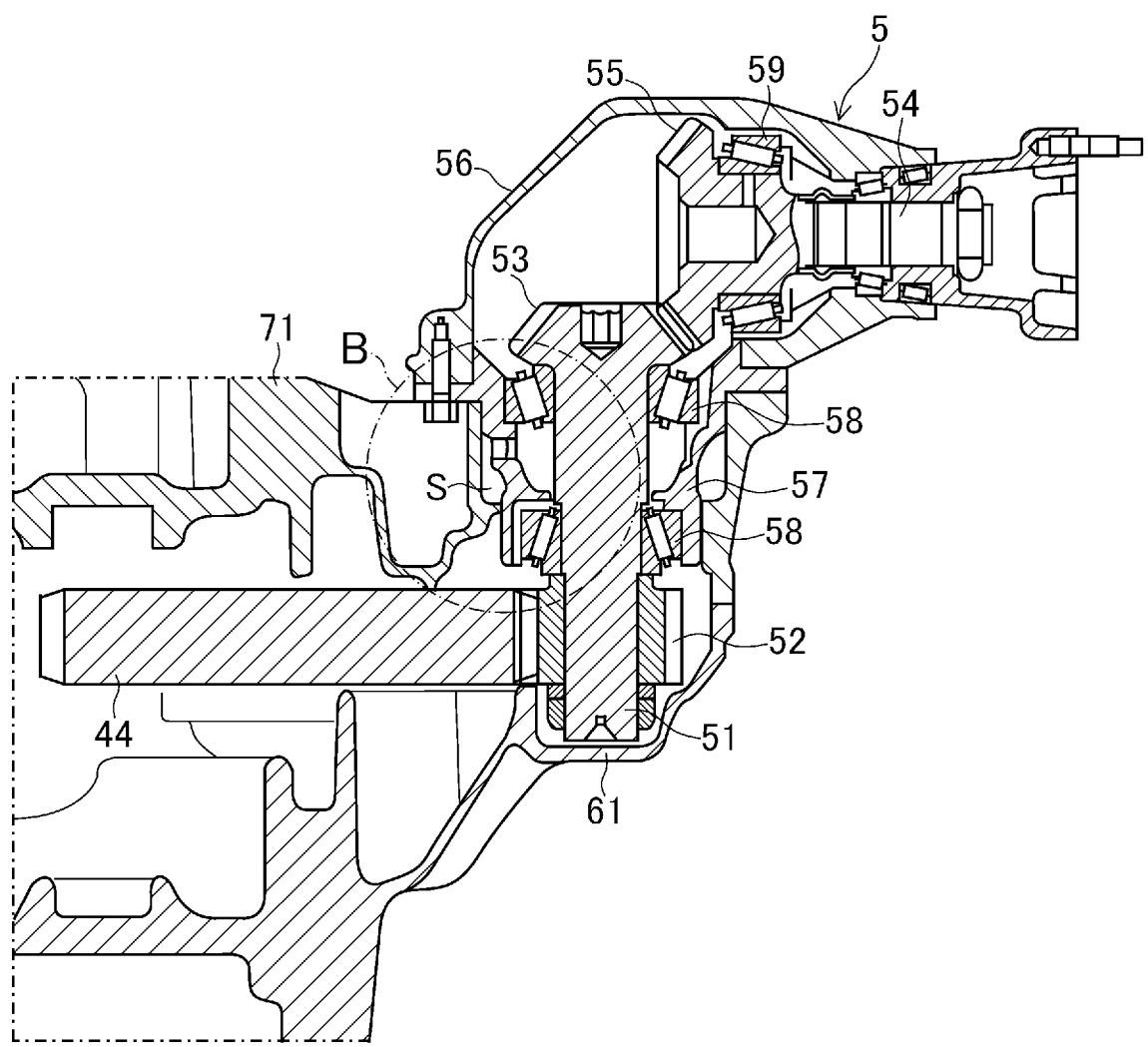
FIG. 10 is a cross-sectional view taken along the line A-A of FIG. 9.
Figure 11:
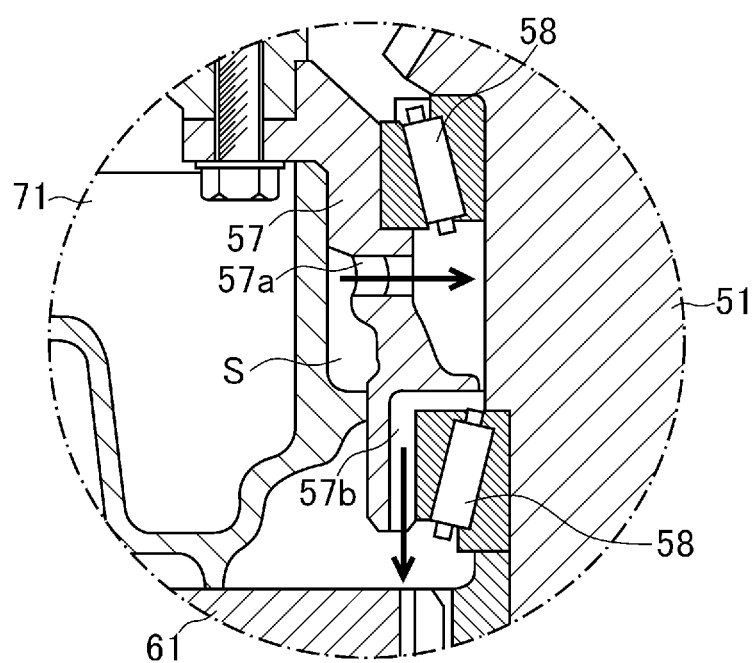
FIG. 11 is an enlarged detailed view of the B part of FIG. 10.

FIG. 9 is a partial side cross-sectional view showing the configuration of the mating surface side of the torque converter case with the transmission case. FIG. 10 is a cross-sectional view taken along the line A-A of FIG. 9, and FIG. 11 is an enlarged detailed view of the B part of FIG. 10. As shown in FIG. 9, the first oil reservoir 73 formed above the transfer input gear 52 communicates with the space S shown in FIG. 10 through a communication hole 74 formed in the torque converter case 71.

Here, as shown in FIG. 10, in the transfer device 5, the first bevel gear 53, the second bevel gear 55, and the like that mesh with each other are housed inside a transfer case 56 and a transfer cover 57 attached thereto. The transfer input shaft 51 formed with the first bevel gear 53 and the transfer output shaft 54 formed with the second bevel gear 55 are rotatably supported by the transfer cover 57 and the transfer case 56 through bearings 58 and 59, respectively, and a space S is formed between the torque converter case 71 and the transfer cover 57.

As shown in FIG. 11, a side part of the transfer cover 57 is formed with a communication hole 57a for communicating the space S with the inside of the transfer cover 57. In addition, an L-shaped bent oil passage (notch groove) 57b is formed in a part supporting the bearing 58 on one side (lower side in FIG. 11) of the transfer cover 57, and the inside of the transfer cover 57 and the inside of the transmission case 61 communicate with each other through this oil passage 57b. Further, as shown in FIG. 9, the oil passage 57b is disposed at a position (facing position) where its outflow end (outflow port) faces the meshing part between the final driven gear 44 and the transfer input gear 52 in the torque converter case 71.

Next, the flow of oil in the lubricating structure configured as described above will be described. FIGS. 12 to 16 are views for illustrating the flow of oil, with the flow of oil added to FIGS. 4, 5, 6, 7 and 9. In each figure, the flow of oil is indicated by a thick one-dot chain line. According to the lubricating structure configured as described above, it is possible to efficiently supply oil that flows in the following three patterns [1] to [3] to the differential device 4 and the bearing 42.

[1] The oil scraped up by the final driven gear 44 is guided and supplied to the differential device 4 and the bearing 42 by the gutter plate 80.

[2] The oil scraped up by the transfer input gear 52 and guided to the first oil reservoir 73 is supplied to the differential device 4 and the bearing 42 by the gutter plate 80.

[3] The oil scattered by the rotation of gears other than the final driven gear 44 (such as the final drive gear 30) is supplied to the differential device 4 (opening 41c of the differential case 41) through the inner surfaces (inner walls) of the transmission case 61 and the torque converter case 71 and the first guide wall 64.

The oil flow of each pattern will be described in detail below.

Figure 12:
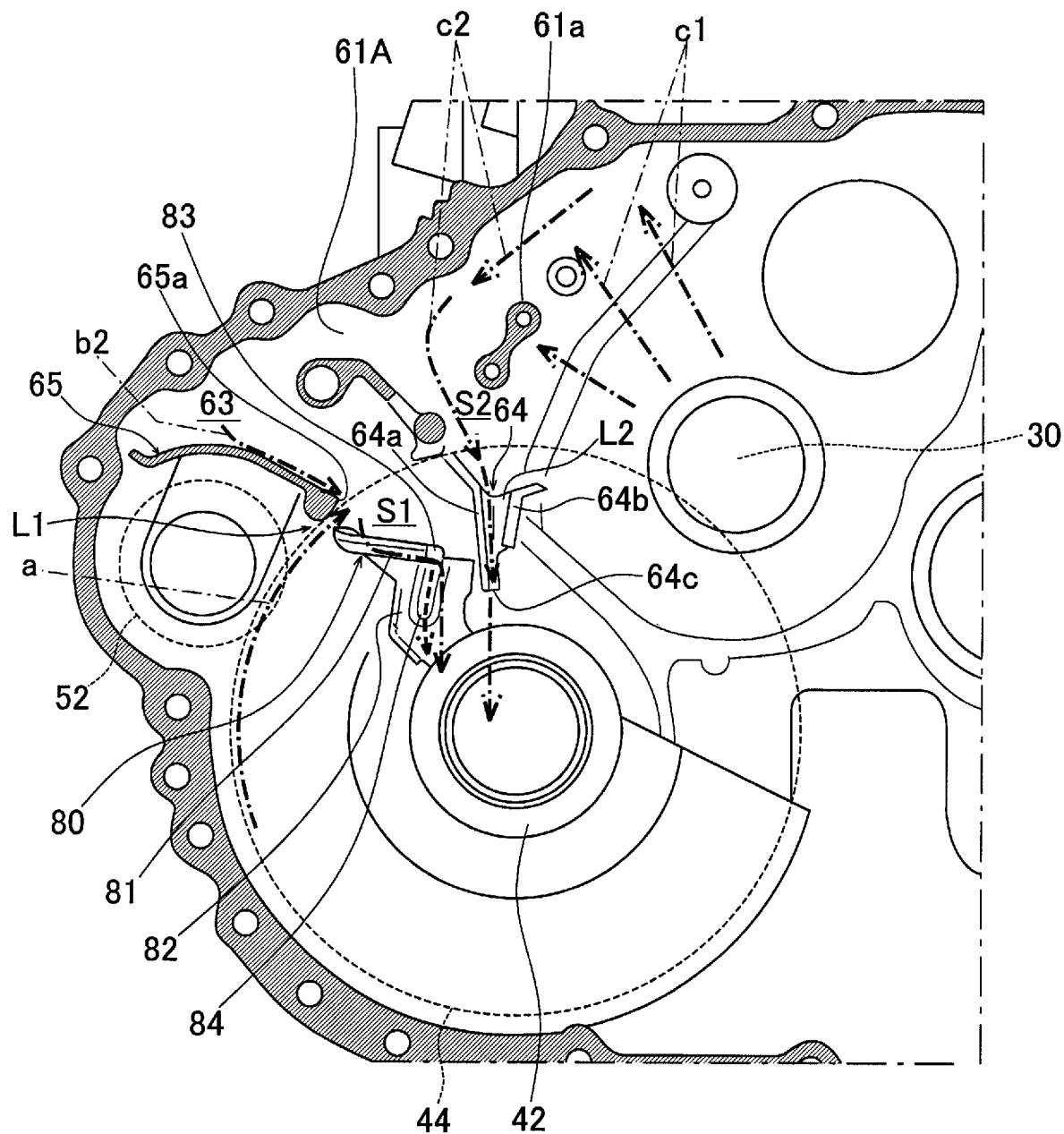
FIG. 12 is a view for illustrating the flow of oil, with the flow of oil added to FIG. 4.
Figure 13:
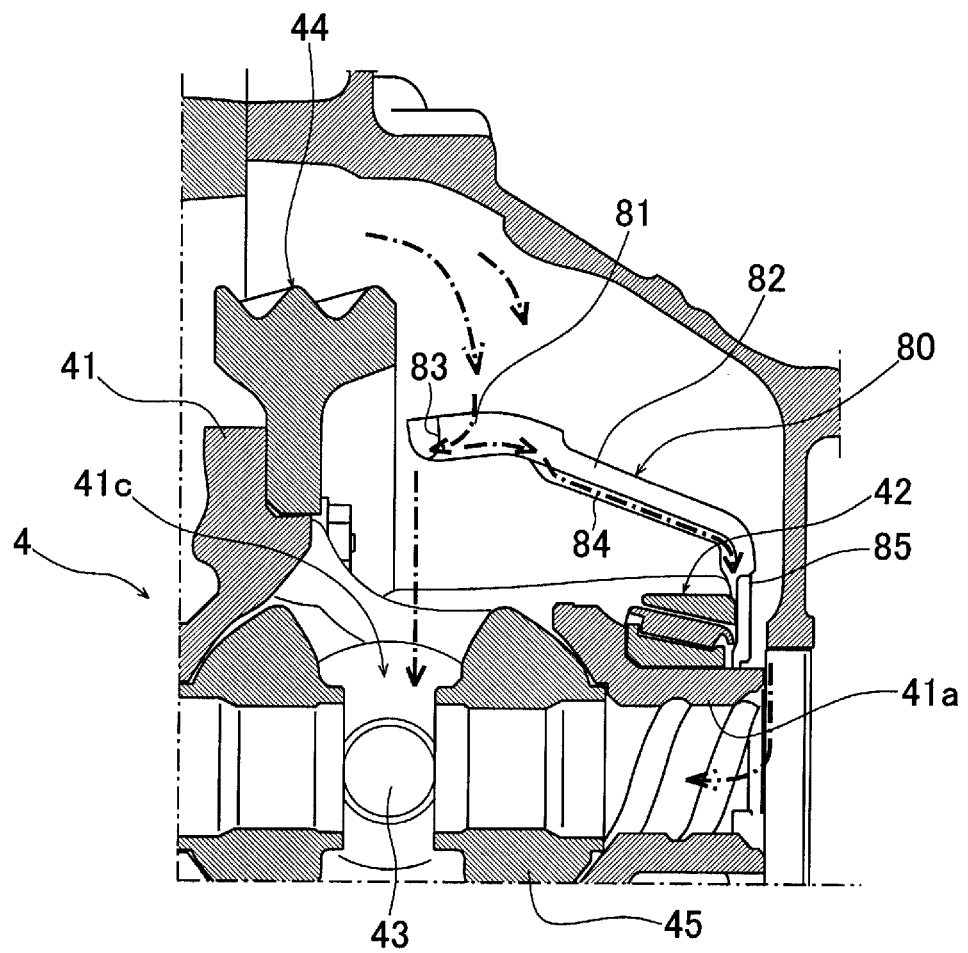
FIG. 13 is a view for illustrating the flow of oil, with the flow of oil added to FIG. 5.

In pattern [1], the rotating final driven gear 44 scrapes up oil along the arrow a in FIG. 12, and the oil flows into the space S1 above the gutter plate 80 through the gap L1 between the lower end 65a of the second guide wall 65 and the gutter plate 80. The oil is received by the oil receiving part 81 of the gutter plate 80. As shown in FIG. 13, a part of the oil received by the oil receiving part 81 drips from the notch 83 of the oil receiving part 81 into the opening 41c of the differential case 41, and lubricates the pinion shaft 43, the pinion gear, the side gear 45, and the like in the opening 41c. Further, another part of the oil received by the oil receiving part 81 flows from the oil receiving part 81 to the inclined part 82, flows along the groove 84 from the inclined part 82 to the extension part 85, drips from the lower end of the extension part 85, and is supplied to the bearing 42, and the bearing 42 is lubricated.

Figure 16:
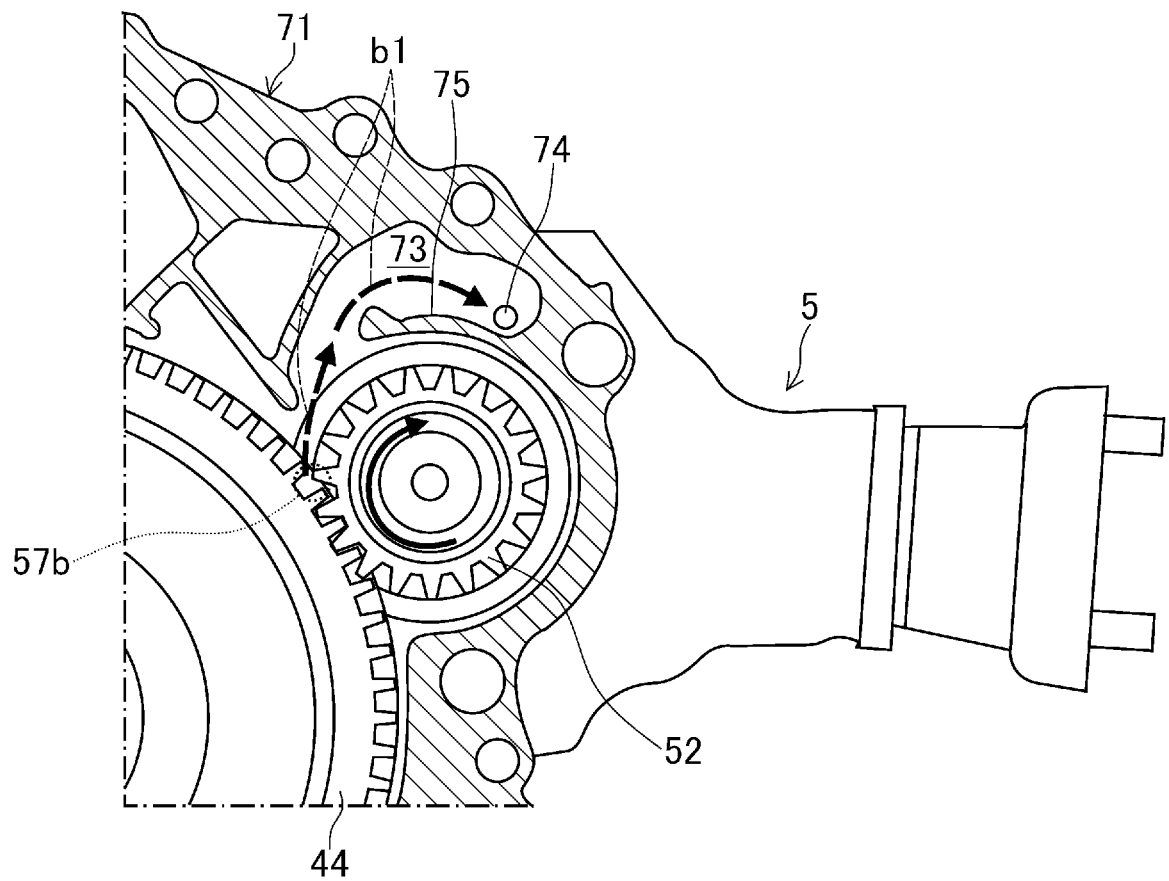
FIG. 16 is a view for illustrating the flow of oil, with the flow of oil added to FIG. 9.

In pattern [2], the oil scraped up by the transfer input gear 52 that meshes with the final driven gear 44 and rotates in the direction of the arrow (clockwise) in FIG. 16 flows into the first oil reservoir 73 as indicated by the arrow b1 in FIG. 16. The oil that has flowed into the first oil reservoir 73 flows from the first oil reservoir 73 into the second oil reservoir 63 that face each other. Then, as indicated by the arrow b2 in FIG. 12, the oil that has flowed into the second oil reservoir 63 flows down along the upper surface of the second guide wall 65, drips from the lower end 65a of the second guide wall 65 to the oil receiving part 81 of the gutter plate 80, and is received by the oil receiving part 81. After that, like pattern [1], as shown in FIG. 13, a part of the oil received by the oil receiving part 81 drips from the notch 83 of the oil receiving part 81 into the opening 41c of the differential case 41, and lubricates the pinion shaft 43, the pinion gear, the side gear 45, and the like in the opening 41c. Further, another part of the oil received by the oil receiving part 81 flows from the oil receiving part 81 to the inclined part 82, flows along the groove 84 from the inclined part 82 to the extension part 85, drips from the lower end of the extension part 85, and is supplied to the bearing 42, and the bearing 42 is lubricated.

Further, a part of the oil in the first oil reservoir 73 flows into the space S (the space between the torque converter case 71 and the transfer cover 57) shown in FIG. 10 through the communication hole 74 (see FIG. 16) that opens to the first oil reservoir 73. As shown in detail in FIG. 11, the oil that has flowed into the space S flows into the transfer cover 57 through the communication hole 57a formed in the transfer cover 57 to lubricate each part, and then flows into the transmission case 61 through the L-shaped oil passage 57b formed in the transfer cover 57. At this time, since the outflow end of the oil passage 57b is disposed at a position facing the meshing part between the final driven gear 44 and the transfer input gear 52, the oil flowing out from the oil passage 57b (return oil from the transfer device 5) is scraped up by the rotation of the final driven gear 44 and the transfer input gear 52, and flows into the first oil reservoir 73 again as indicated by the arrow b1 in FIG. 16. In this embodiment, the outflow end of the oil passage 57b is disposed at a position facing the meshing part between the final driven gear 44 and the transfer input gear 52, but the illustration of other configurations is omitted. However, the outflow end of the oil passage 57b may be disposed above the position facing the meshing part between the final driven gear 44 and the transfer input gear 52.

Figure 14:
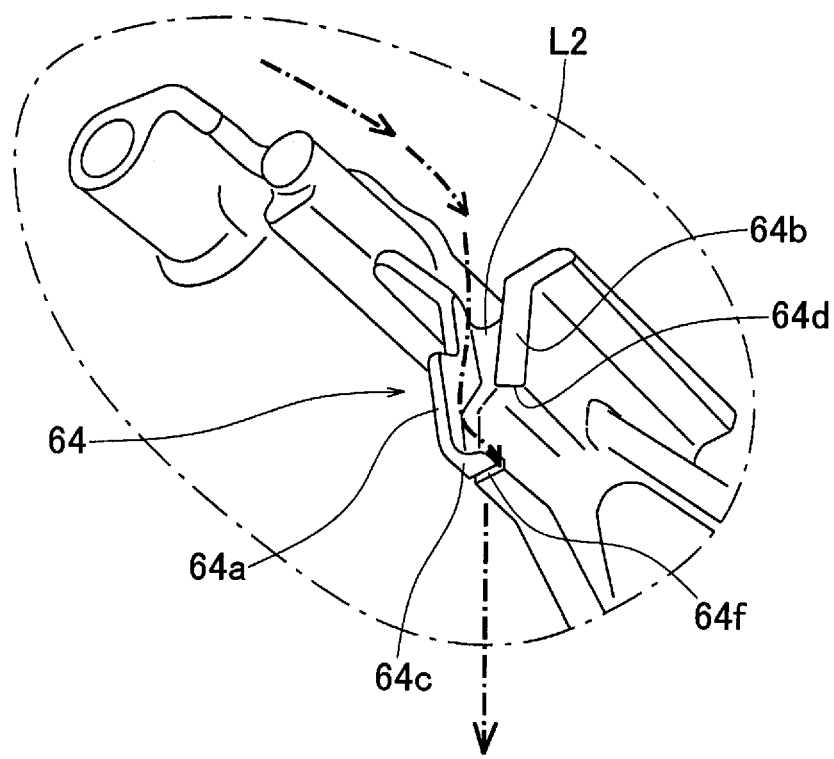
FIG. 14 is a view for illustrating the flow of oil, with the flow of oil added to FIG. 6.
Figure 15:
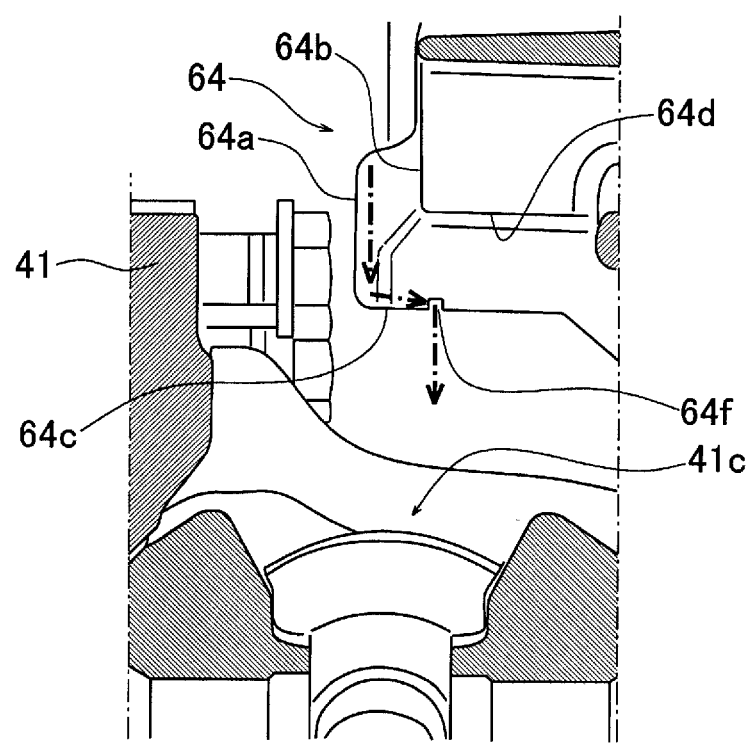
FIG. 15 is a view for illustrating the flow of oil, with the flow of oil added to FIG. 7.

In pattern [3], the rotation of the final drive gear 30 meshing with the final driven gear 44 causes oil to scatter as indicated by the arrow c1 in FIG. 12. The oil hits the upper inner peripheral surface of the transmission case 61 and the guide part 61a, falls, flows into the space S2 above the first guide wall 64 as indicated by the arrow c2 in FIG. 12, and is received by the first rib 64a of the first guide wall 64. As shown in FIGS. 14 and 15, the oil received by the first rib 64a flows along the surface of the first rib 64a and flows down through the gap L2 between the first rib 64a and the second rib 64b. The oil that has flowed along the surface of the first rib 64a drips from the notch 64f of the lower end 64c of the first rib 64a into the opening 41c directly below, and lubricates the pinion shaft 43, the pinion gear, the side gear 45, and the like in the opening 41c.

As described above, in the lubricating structure of this embodiment, the transmission case 61 includes: a first guide wall 64 located above the bearing 42 and guiding the oil scraped up by the final drive gear 30 or the transfer input gear 52 to the differential device 4 and the bearing 42; a second oil reservoir (oil reservoir) 63 provided above the transfer input gear 52; and a second guide wall 65 provided below the second oil reservoir 63 and extending toward the central axis of the final driven gear 44; and the lubricating structure includes a gutter plate (oil catch member) 80 that receives oil guided by the second guide wall 65 and supplies it to the differential device 4 and the bearing 42. In addition, the gutter plate 80 includes: an oil receiving part 81 which is a first inclined part inclined so that the direction of the first guide wall 64 is lowered; a notch 83 formed at a position facing the opening (differential opening) 41c formed in the differential case 41; and a groove 84 for oil guiding that extends toward the bearing 42.

According to the lubricating structure of this embodiment, the oil that is scraped up by the final drive gear 30 or the transfer input gear 52 is guided by the first guide wall 64 to the differential device 4 and the bearing 42 that supports the final driven gear 44. Therefore, the oil lubricates the differential device 4 and the bearing 42 effectively. In addition, by providing the gutter plate (oil catch member) 80 configured as described above, the oil that has been scraped up by the rotation of the transfer input gear 52 and has flowed into the second oil reservoir (oil reservoir) 63 is guided from the second oil reservoir 63 to the differential device 4 and the bearing 42 through the second guide wall 65 and the gutter plate 80. Therefore, the differential device 4 and the bearing 42 are lubricated more effectively. In particular, since oil is supplied to the opening 41c of the differential case 41 through the notch 83 formed in the gutter plate 80, the pinion shaft 43, the side gear 45 and the like in the differential device 4 may be effectively lubricated. At the same time, since oil is supplied to the bearing 42 through the groove 84 for oil guiding, the bearing 42 may be effectively lubricated.

Therefore, the oil scraped up by the final driven gear 44, the final drive gear 30 and the transfer input gear 52 is collected in the second oil reservoir 63 and supplied from the second oil reservoir 63 to the bearing 42 of the final driven gear 44 to lubricate the bearing 42. In addition, a part of the oil is also supplied to the differential device 4 to lubricate the differential device 4. Therefore, it is possible to effectively lubricate the bearing 42 and the differential device 4 of the power transmission device PT without increasing the amount of oil.

Further, in the lubricating structure of this embodiment, the gutter plate 80 is disposed at a position lower than the lower end 65a of the second guide wall 65 with a gap L1 between it and the lower end 65a.

According to this configuration, since the gutter plate 80 is positioned lower than the lower end 65a of the second guide wall 65, oil dripping from the lower end 65a of the second guide wall 65 may be more reliably received by the gutter plate 80, and may be supplied to the differential device 4 and the bearing 42. In addition, since the gutter plate 80 is disposed with a gap L1 between it and the lower end 65a of the second guide wall 65, the oil scraped up by the final driven gear 44 or the transfer input gear 52 passes through this gap L1 and is received by the gutter plate 80. Therefore, it is possible to effectively perform lubrication by the oil scraped up by the final driven gear 44 or the transfer input gear 52.

In addition, in the lubricating structure of this embodiment, the gutter plate 80 includes an oil receiving part 81 that receives oil from the second guide wall 65, and an inclined part (second inclined part) 82 inclined from the oil receiving part 81 toward the bearing 42. The first inclined part and notch 83 of the disclosure are provided in the oil receiving part 81, and the groove 84 is provided in the inclined part 82.

According to this configuration, oil may be guided into the opening 41c of the differential case 41 by the first inclined part and the notch 83 provided in the oil receiving part 81 of the gutter plate 80. Therefore, it is possible to perform effective lubrication of the differential device 4, and it is possible to perform effective lubrication of the bearing 42 that supports the final driven gear 44 by the groove 84 provided in the inclined part 82.

In addition, in the lubricating structure of this embodiment, a notch ("another notch" of the disclosure) 64f is provided at a position facing the opening 41c of the differential case 41 in the lower end 64c of the first guide wall 64 (first rib 64a).

According to this configuration, the oil may be guided to the opening 41c of the differential case 41 through the notch 64f of the first guide wall 64. Therefore, it is possible to more effectively lubricate the differential device 4 by the first guide wall 64.

The application of the disclosure is not limited to the embodiments described above, and various modifications may be made within the scope of the technical ideas described in the claims, the specification and the drawings.

What is claimed is:

1. A lubricating structure for a vehicle power transmission device, comprising:
   a case in which oil is stored at a bottom, wherein the case houses:
      a transmission comprising a differential device, a final driven gear attached to a differential case of the differential device and rotatably supported on the case by a bearing, and a final drive gear meshing with the final driven gear; and
      a transfer device comprising a transfer input gear that meshes with the final driven gear, wherein the transfer input gear meshes with the final driven gear above a rotation center of the final driven gear,
   wherein the case comprises:
      a first guide wall positioned above the bearing for guiding oil scraped up by the final drive gear or the transfer input gear to the differential device and the bearing;
      an oil reservoir provided above the transfer input gear; and
      a second guide wall provided below the oil reservoir and extending obliquely toward a central axis of the final driven gear;
   wherein the lubricating structure further comprises:
      an oil catch member that receives oil guided by the second guide wall and supplies the oil to the differential device and the bearing, wherein the oil catch member comprises a first inclined part inclined so that a direction of the first guide wall is lowered, a notch formed at a position facing an opening formed in the differential case, and a groove for oil guiding that extends toward the bearing.

2. The lubricating structure for the vehicle power transmission device according to claim 1, wherein the oil catch member is disposed at a position lower than a lower end of the second guide wall with a gap therebetween.

3. The lubricating structure for the vehicle power transmission device according to claim 2, wherein the oil catch member comprises:
an oil receiving part that receives oil from the second guide wall; and
a second inclined part inclined from the oil receiving part toward the bearing,
the first inclined part and the notch are provided in the oil receiving part, and
the groove is provided in the second inclined part.

4. The lubricating structure for the vehicle power transmission device according to claim 3, wherein another notch is provided at a position facing the opening in a lower end of the first guide wall.

5. The lubricating structure for the vehicle power transmission device according to claim 2, wherein another notch is provided at a position facing the opening in a lower end of the first guide wall.

6. The lubricating structure for the vehicle power transmission device according to claim 1, wherein the oil catch member comprises:
an oil receiving part that receives oil from the second guide wall; and
a second inclined part inclined from the oil receiving part toward the bearing,
the first inclined part and the notch are provided in the oil receiving part, and
the groove is provided in the second inclined part.

7. The lubricating structure for the vehicle power transmission device according to claim 6, wherein another notch is provided at a position facing the opening in a lower end of the first guide wall.

8. The lubricating structure for the vehicle power transmission device according to claim 1, wherein another notch is provided at a position facing the opening in a lower end of the first guide wall.

* * * * *